(12) United States Patent
Gibson et al.

(10) Patent No.: US 8,776,168 B1
(45) Date of Patent: Jul. 8, 2014

(54) APPLYING SECURITY POLICY BASED ON BEHAVIORALLY-DERIVED USER RISK PROFILES

(75) Inventors: Douglas Gibson, Newton, MA (US); Keith Newstadt, Newton, MA (US)

(73) Assignee: Symantec Corporation, Mountain View, CA (US)

(*) Notice: Subject to any disclaimer, the term of this patent is extended or adjusted under 35 U.S.C. 154(b) by 430 days.

(21) Appl. No.: 12/608,772

(22) Filed: Oct. 29, 2009

(51) Int. Cl.
*H04L 29/00* (2006.01)
*H04L 29/06* (2006.01)

(52) U.S. Cl.
CPC ............ *H04L 63/102* (2013.01); *H01L 63/104* (2013.01)
USPC .............................................. 726/1; 709/225

(58) Field of Classification Search
CPC ..... H04L 63/10; H04L 63/101; H04L 63/102; H04L 63/104; H04L 63/105; H04L 63/107; H04L 63/20; H04L 63/205
USPC ................... 726/1, 5–6, 22–28; 709/224–225
See application file for complete search history.

(56) References Cited

U.S. PATENT DOCUMENTS

| | | | |
|---|---|---|---|
| 7,284,124 B1 | 10/2007 | Ginsberg | |
| 7,490,356 B2 * | 2/2009 | Lieblich et al. | 726/25 |
| 7,571,482 B2 | 8/2009 | Polyakov et al. | |
| 7,617,519 B2 | 11/2009 | Williams | |
| 7,647,634 B2 | 1/2010 | Mayfield et al. | |
| 7,707,632 B2 | 4/2010 | Nath et al. | |
| 7,761,912 B2 | 7/2010 | Yee et al. | |
| 7,788,700 B1 | 8/2010 | Feezel et al. | |
| 7,831,522 B1 | 11/2010 | Satish et al. | |
| 7,870,609 B2 | 1/2011 | Hulten et al. | |
| 7,917,481 B1 | 3/2011 | Kale et al. | |
| 8,087,082 B2 | 12/2011 | Bloch et al. | |
| 8,095,112 B2 | 1/2012 | Chow et al. | |
| 8,145,562 B2 * | 3/2012 | Wasserblat et al. | 705/38 |
| 8,225,406 B1 | 7/2012 | Nachenberg | |
| 8,250,657 B1 | 8/2012 | Nachenberg et al. | |
| 8,272,061 B1 * | 9/2012 | Lotem et al. | 726/25 |

(Continued)

OTHER PUBLICATIONS

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

(Continued)

*Primary Examiner* — Saleh Najjar
*Assistant Examiner* — Eric W Shepperd
(74) *Attorney, Agent, or Firm* — Fenwick & West LLP (57) ABSTRACT

Security policy changes can be implemented for a user or a user group based on behaviorally-derived risk information. A behavior-receiving module receives information about user behaviors for the user across various clients with which the user interacts. An attribute-receiving module receives one or more user attributes identified for a user. A profile-generating module generates a user risk profile for the user based on the received information about the user behaviors and the received user attributes. A user scoring module assigns the user a user risk score based on an evaluation of the user risk profile for the user. Similarly, groups of users can be given group risk scores, or users can have combined group/user scores. Finally, a remediation module automatically establishes a security policy requiring remediative actions for the user (or user group) based on the user risk score or combined score (or group score).

19 Claims, 5 Drawing Sheets

(56) References Cited

U.S. PATENT DOCUMENTS

| | | | |
|---|---|---|---|
| 8,296,244 B1* | 10/2012 | Heroux | 705/317 |
| 8,359,632 B2 | 1/2013 | Guo et al. | |
| 2002/0019941 A1* | 2/2002 | Chan et al. | 713/185 |
| 2002/0046041 A1 | 4/2002 | Lang | |
| 2002/0099586 A1* | 7/2002 | Bladen et al. | 705/7 |
| 2004/0019807 A1 | 1/2004 | Freund | |
| 2005/0204162 A1* | 9/2005 | Rayes et al. | 713/201 |
| 2005/0232423 A1 | 10/2005 | Horvitz et al. | |
| 2005/0257244 A1* | 11/2005 | Joly et al. | 726/1 |
| 2006/0206935 A1* | 9/2006 | Choi et al. | 726/22 |
| 2006/0212931 A1* | 9/2006 | Shull et al. | 726/10 |
| 2006/0253458 A1 | 11/2006 | Dixon et al. | |
| 2006/0253583 A1 | 11/2006 | Dixon et al. | |
| 2007/0033636 A1 | 2/2007 | Buckley et al. | |
| 2007/0064617 A1 | 3/2007 | Reves | |
| 2007/0067844 A1 | 3/2007 | Williamson et al. | |
| 2007/0094260 A1 | 4/2007 | Murphy et al. | |
| 2007/0168311 A1 | 7/2007 | Genty et al. | |
| 2007/0208613 A1 | 9/2007 | Backer | |
| 2007/0261116 A1* | 11/2007 | Prafullchandra et al. | 726/22 |
| 2008/0022384 A1 | 1/2008 | Yee et al. | |
| 2008/0052758 A1 | 2/2008 | Byrnes | |
| 2008/0092235 A1 | 4/2008 | Comlekoglu | |
| 2008/0115213 A1* | 5/2008 | Bhatt et al. | 726/22 |
| 2008/0120699 A1 | 5/2008 | Spear | |
| 2008/0133531 A1 | 6/2008 | Baskerville et al. | |
| 2008/0141366 A1 | 6/2008 | Cross et al. | |
| 2008/0189788 A1* | 8/2008 | Bahl | 726/25 |
| 2008/0255928 A1* | 10/2008 | Tomeny | 705/10 |
| 2008/0288330 A1 | 11/2008 | Hildebrand et al. | |
| 2009/0044024 A1 | 2/2009 | Oberheide et al. | |
| 2009/0165131 A1 | 6/2009 | Treadwell | |
| 2009/0172815 A1 | 7/2009 | Gu et al. | |
| 2009/0240769 A1 | 9/2009 | Schran | |
| 2009/0276257 A1* | 11/2009 | Draper et al. | 705/7 |
| 2009/0282476 A1 | 11/2009 | Nachenberg et al. | |
| 2009/0287819 A1 | 11/2009 | Iverson | |
| 2009/0300712 A1* | 12/2009 | Kaufmann et al. | 726/1 |
| 2009/0328209 A1 | 12/2009 | Nachenberg | |
| 2009/0328224 A1 | 12/2009 | Hernacki et al. | |
| 2010/0031361 A1 | 2/2010 | Shukla | |
| 2010/0100930 A1* | 4/2010 | King | 726/1 |
| 2010/0125911 A1* | 5/2010 | Bhaskaran | 726/23 |
| 2010/0145953 A1* | 6/2010 | Charles et al. | 707/748 |
| 2012/0167162 A1* | 6/2012 | Raleigh et al. | 726/1 |
| 2013/0268994 A1* | 10/2013 | Cooper et al. | 726/1 |

OTHER PUBLICATIONS

Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Extended Search Report, European Application No. 09169538.7, Oct. 25, 2010, 5 pages.

European Examination Report, European Application No. 09169538.7, Jan. 16, 2012, 4 pages.

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

* cited by examiner

APPLYING SECURITY POLICY BASED ON BEHAVIORALLY-DERIVED USER RISK PROFILES

BACKGROUND OF THE INVENTION

1. Field of the Invention

This invention pertains in general to computer security, and more specifically to measuring security risk posed by and applying security policy changes for individual network users and groups of users.

2. Description of the Related Art

Security policies applied to various computer systems typically define what it means for the systems to be secure. Most commonly, security policies are applied specifically to devices and machines, defining various security requirements or constraints for those devices/machines. Security policies generally define the constraints placed on functions of a machine, on access to the machine by external systems, and so forth. Further, security audits, or systematic reviews of security policies for a system, typically focus on machine attributes, such as security software configuration and virus definition versions.

Though security policies tend to be applied to the machine/device, infection risk is often more closely related to user behavior than to machine/device deployment. Users can take a variety of different actions on a machine or device that weakens the security or opens the system up to security risks. For example, users can access websites with bad reputations or that are known to be risky, click on links or open email attachments from unknown or suspicious users, click on spam messages, use weak passwords, download untrustworthy software, ignore security warnings, etc. Yet, current security audit and remediation mechanisms generally do not factor user behavior into risk assessments or consider user behavior in how remediation is employed.

Due to an ongoing lack of resources, system administrators are under increasing pressure to deliver better security with less staff. Because of this, administrators would prefer to invest more time in proactive steps that could prevent problems before they occur rather than costly reactive measures. Despite the fact that many security threats today are directly related to user behavior, current security mechanisms are focused primarily on machines/devices. As a result, they fail to pull together information about risky user behaviors that would help administrators take proactive steps to remediate these risks. There is currently no solution available to system administrators that measures the security risk of users based on user behaviors across devices. Further, there is no mechanism for measuring security risks of groups of users associated with an organization.

Therefore, there is a need in the art for a solution that measures the security risk posed by behaviors of individual users and groups of users, and adjusts security policies based on these risks.

DISCLOSURE OF INVENTION

The above and other needs are met by a computer-implemented method, computer system, and computer-readable storage medium in which a security module establishes a security policy for a user based on risk information for that user. The method includes receiving information about user behaviors for the user across various clients with which the user interacts, and receiving one or more user attributes identified for the user. The method also includes generating a user risk profile for the user based on the received information about the user behaviors and the received user attributes. The method further includes assigning the user a user risk score based on an evaluation of the user risk profile for the user. In addition, the method includes automatically establishing a security policy requiring a plurality of remediative actions for the user based on the user risk score.

Embodiments of the computer-readable storage medium store executable computer program instructions for initiating security policy changes for a user based on risk information for that user. The instructions further comprise instructions for receiving information about user behaviors for the user across various clients with which the user interacts, and for receiving one or more user attributes identified for the user. The instructions also include instructions for generating a user risk profile for the user based on the received information about the user behaviors and the received user attributes. In addition, the instructions include instructions for assigning the user a user risk score based on an evaluation of the user risk profile for the user. The instructions further comprise instructions for automatically establishing a security policy requiring a plurality of remediative actions for the user based on the user risk score.

Embodiments of the computer system comprise a system for initiating security policy changes for a user based on risk information for that user. A behavior-receiving module receives information about user behaviors for the user across various clients with which the user interacts. An attribute-receiving module receives one or more user attributes identified for the user. A profile-generating module generates a user risk profile for the user based on the received information about the user behaviors and the received user attributes. A user scoring module assigns the user a user risk score based on an evaluation of the user risk profile for the user. Finally, a remediation module automatically establishing a security policy requiring a plurality of remediative actions for the user based on the user risk score The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
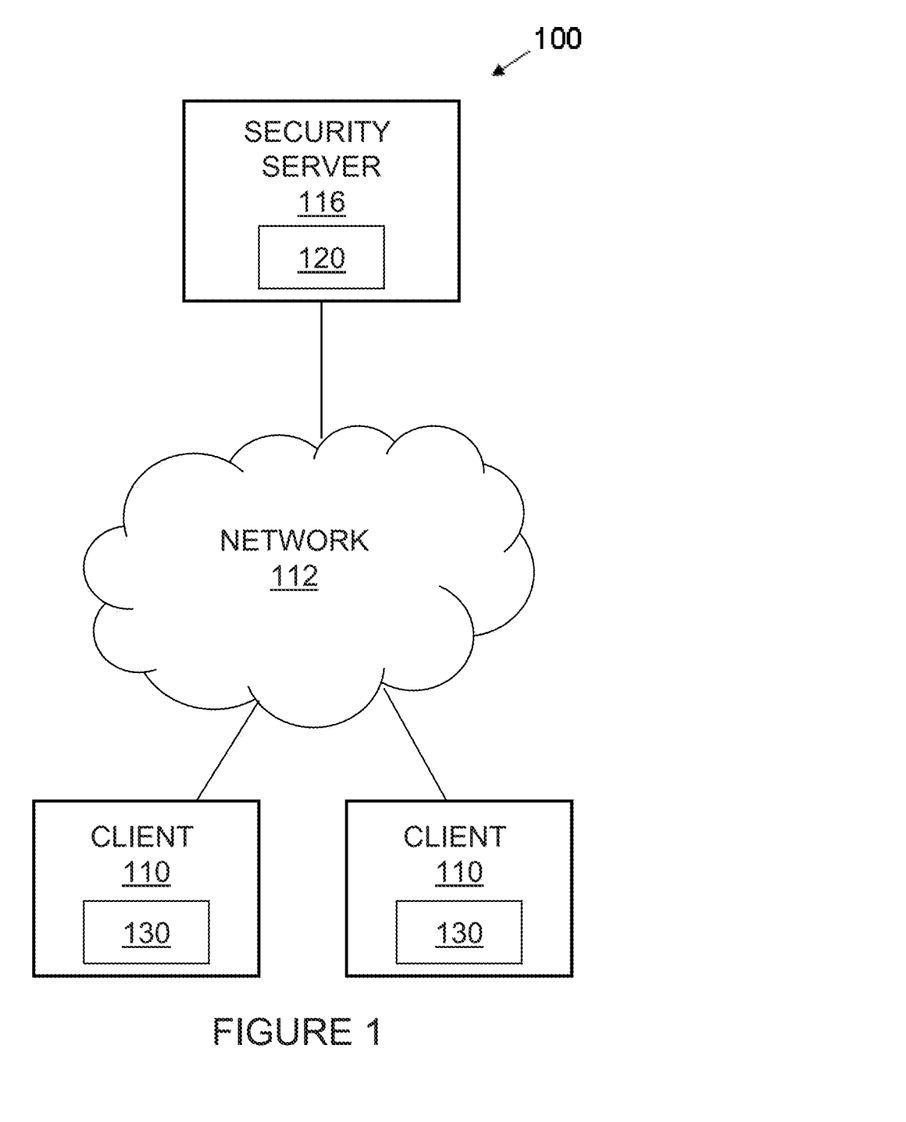
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a security server 116 and clients 110 connected by a network 112. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The security server 116 serves information or content to clients 110 via the network 112. In one embodiment, the security server 116 is located at a website provided by SYMANTEC CORPORATION, although the server can also be provided by another entity. The security server 116 can include a database for storing information and a web server for interacting with clients 110. The server 116 can send information stored in the database across the network 112 and to the clients 110, and can also receive information from the clients 110. For example, the clients 110 can send to the server 116 information about one or more users of the clients 110, including behaviors and attributes of the users. One or more of the functions of the security server 116 can also be executed on the client 110 or in a cloud computing environment. As used herein, cloud computing refers to a style of computing in which dynamically scalable and often virtualized resources are provided as a service over the Internet.

The clients 110 are computers or other electronic devices that can interact with the security server 116 or other clients 110. The clients 110, for example, can be personal computers executing a web browser that allows the user to browse and search for information available at a website associated with the server 116. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS°, and PALM OS®), which controls the operation of the computer system, and executes one or more application programs. The clients 110 can perform activities and make requests for or otherwise acquire information from the security server 116 or other computers. For example, the clients 110 or modules on the clients 110 can provide data to the server 116 about users and their behaviors when interacting with the clients 110.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the security server 116 executes a security module 120 that provides a mechanism for measuring the security risk posed by individual network users and/or groups of users. Also in the FIG. 1 embodiment, the clients 110 execute a reporting module 130 for reporting information to the server 116 about the users of the clients 110. The security module 120 and reporting module 130 can be discrete application programs, or can be integrated into other application programs or an operating system. In some embodiments, a portion of the security module 120 is executed on the clients 110 and/or a portion of the reporting module 130 is executed on the server 116. Similarly, all or a portion of the modules 120, 130 can be executed in a cloud computing environment.

In brief summary, the security module 120 receives information (e.g., from the reporting module 130) about user behaviors for one or more users across multiple clients with which the user interacts (e.g., the user's desktop computer, laptop, smartphone, etc.). The user behaviors can include behaviors that indicate the tendency of the user to engage in risky conduct on the client 110 (e.g., to open email attachments from unknown users, to download suspicious software or visit suspicious websites, etc.). The module 120 also receives (e.g., from the reporting module 130) one or more user attributes identified for each user (e.g., personal information about the user, his geographic location, his company department, etc.). The module 120 further generates a user risk profile for each user based on the received behavior and attribute information, and assigns each user a user risk score based on the module's 120 evaluation of the user's risk profile. In some embodiments, groups of users (e.g., in a particular company department, geographic location, etc.) can be assigned group risk scores. The module 120 then automatically establishes a security policy (or initiates security policy changes) requiring remediative actions for the user(s) (or user group(s)) based on the user risk score (or group risk score). The security policy can also be established/changed based on security rules configurable by a system administrator. The module 120 allows the system administrators to see patterns of risk. The system administrators can thus focus their efforts on the portion of the user population most likely to run into security problems and can take preventive measures (e.g., required security training, etc.) to limit the harm caused by these users/groups.

In brief summary, the reporting module 130 on each client 110 collects the user behavior information for the user (e.g., from one or more security products on the client or other sources that track user behavior) and collects the user attributes (e.g., from a corporate directory, a corporate intranet, or other user data source). The module 130 then provides the collected information to the security server 116 (e.g., to the security module 120) for analysis. Once the security module 120 of the server 116 has performed the analysis described above, the module 130 can implement the policy changes and remediative actions required.

Figure 2:
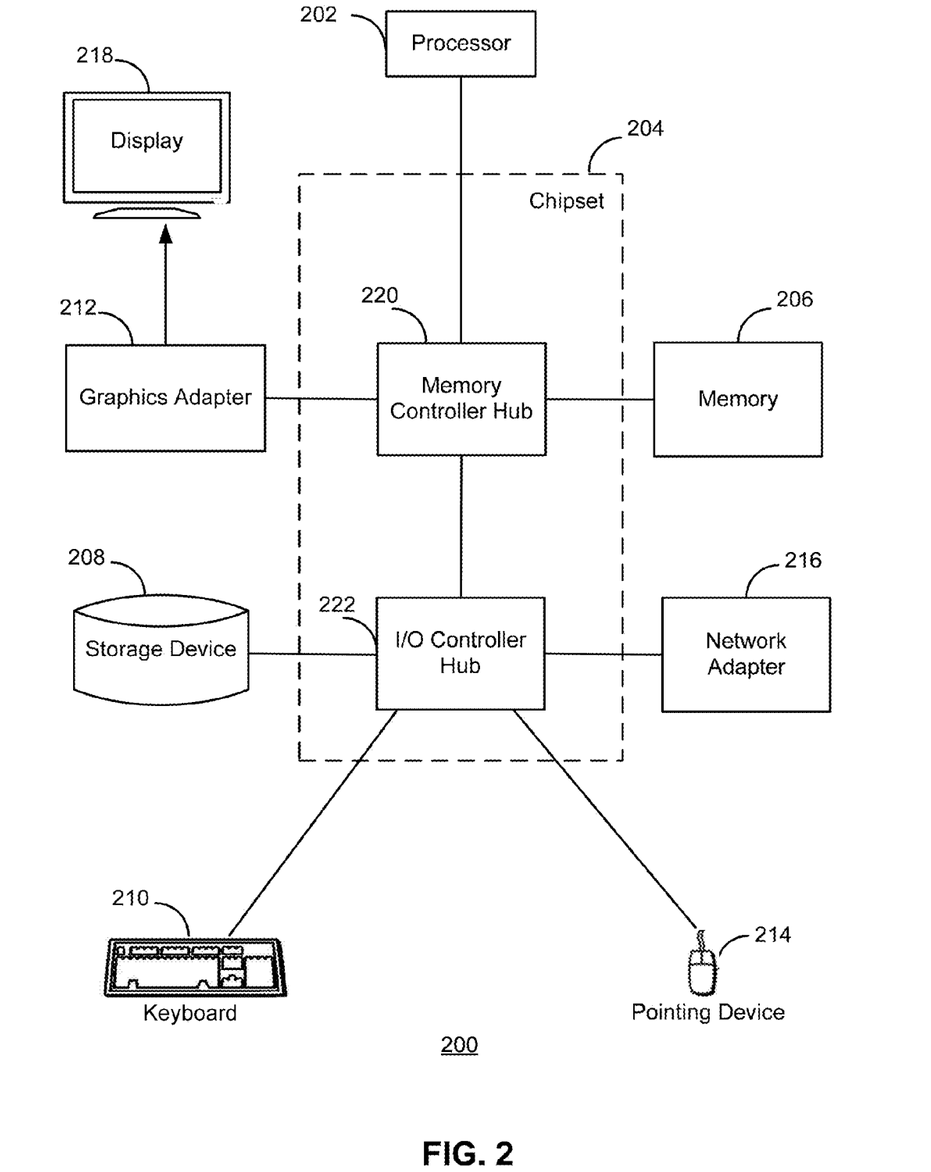
FIG. 2 is a high-level block diagram illustrating a computer system 200 for use with the present invention.

FIG. 2 is a high-level block diagram illustrating an example of a computer 200 for use as a server 116 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
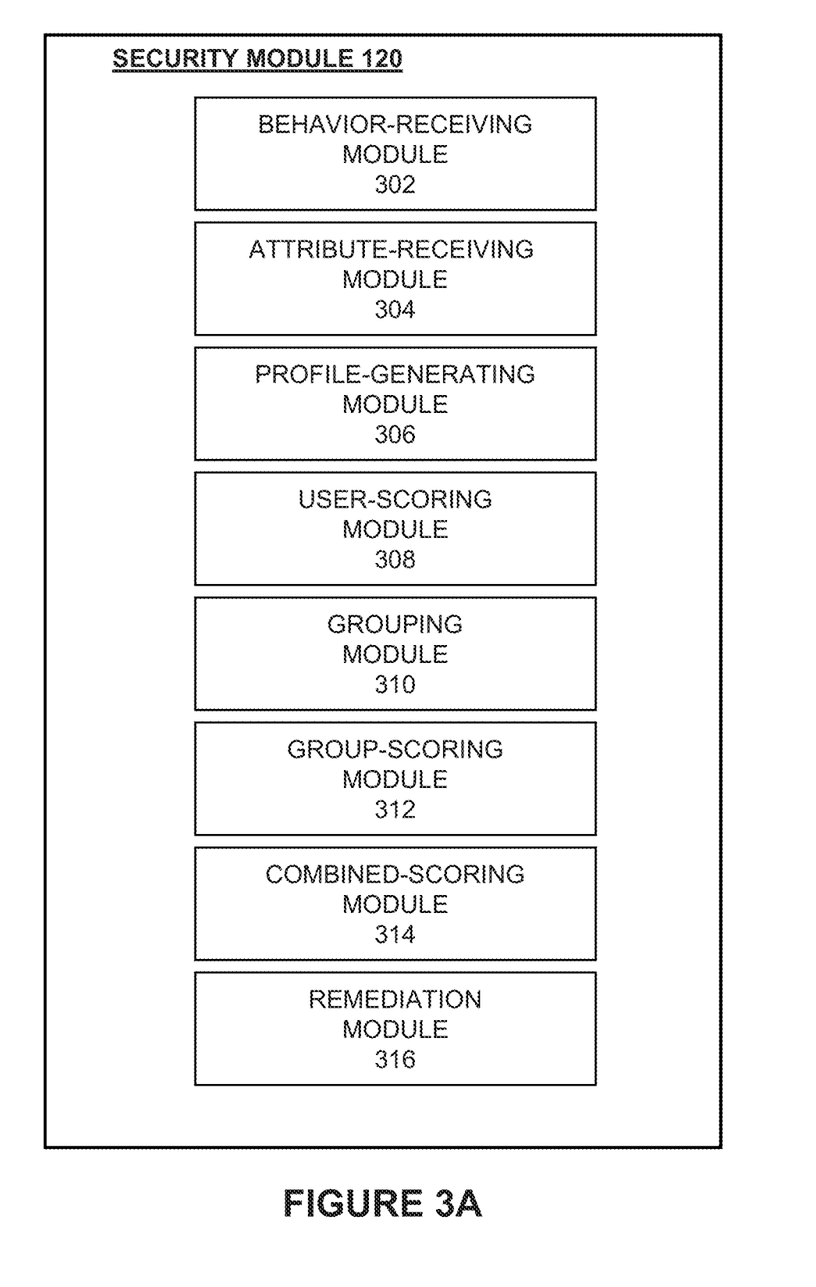
FIG. 3A is a high-level block diagram illustrating the functional modules within the security module 120 of the server 116, according to one embodiment of the present invention.

FIG. 3A is a high-level block diagram illustrating the functional modules within the security module 120 of the security server 116, according to one embodiment of the present invention. The security module 120, in the embodiment illustrated in FIG. 3A, includes a behavior-receiving module 302, an attribute-receiving module 304, a profile-generating module 306, a user scoring module 308, a grouping module 310, a group scoring module 312, a combined scoring module 314, and a remediation module 316. Some embodiments of the security module 120 have different and/or additional modules than those shown in FIGS. 3A, 3B and the other figures. Likewise, the functionalities can be distributed among the modules in a manner different than described herein. Certain modules and functions can be incorporated into other modules of the security module 120 and/or other entities on the network 112, including the clients 110.

The behavior-receiving module 302 receives information about user behaviors for the user across the one or more clients 110 with which the user interacts. The module 302 can thus receive information about the user's behaviors on one client or on all clients 110 used by the user For example, if the user interacts with or uses a desktop computer, a laptop computer, and one or more smartphones, the module 302 can receive information from all of these different clients 110 about the user's actions taken on or behaviors engaged in on each of those clients 110. Similarly, the user may have a number of personal-use clients 110 (e.g., the user's home computer or personal smartphone) and the user may have a number of work-use clients 110 (e.g., the user's work computer or a PDA used for or provided by the user's place of employment). The module 302 can receive information from any of these clients 110 about the user's behavior. Some users may tend to take certain actions (e.g., risky actions) only on their laptops or only on their work-related computers, but may be more careful with their smart phones or home-use clients 110. However, the module 302 can collect information from all of these clients 110, so can even gather information about risky actions taken by a user on only one client 110 or on only certain clients 110.

There can be various different user behaviors about which information is received by the behavior-receiving module 302. The behavior data collected for each user can indicate whether the user has a tendency to engage in risky behaviors that are known to be more likely to lead to infections of clients by malware than other behaviors. For example, the user behaviors for which information is received can include various user actions, such as opening messages from or clicking on links in email messages sent by other users that are not in the user's address book, using weak passwords, using peer-to-peer sites, clicking on email messages that are detected as spam, opening executable files or .exe email attachments, failing to regularly install security patches, ignoring security warnings received from a security program on the user's computer, and other similar actions. Other behaviors can include visiting websites known to be risky or unknown websites that are suspected to be risky, downloading/installing software known or suspected to be risky or untrustworthy, and so forth. Thus, behaviors can include actions that are suspected to be risky (e.g., downloading unknown software), and can also include actions that are known to be risky or to cause or result in malware infections (e.g., downloading software known to be infected or known to be associated with a malicious entity).

As used herein, the term "risky," "risk," or "risk level" in relation to user actions/behaviors refers to a likelihood of an action or behavior to cause or lead to a malware infection of a client 110, to result in damage or harm to a client 110, or to otherwise open a client 110 up to or make a client more available to malware threats or malicious code/entities. In some embodiments, an action or behavior is considered risky when it is above a particular risk threshold or when it has more than a specified likelihood to result in malware infection or harm to the client 110. Similarly, a "high risk" user is one that is more likely to engage in or more regularly engages in risky behaviors than other users, or one that engages in higher risk behaviors than other users. As used herein, "malicious code" or "malware" is any code that enters a computer without an authorized user's knowledge and/or without an authorized user's consent with the intention of conducting malicious activities on the computer or on other computers.

The information regarding user behaviors can be received from a variety of sources by the behavior-receiving module 302. In one embodiment, the information is received from the reporting module 130 on each client 110. The reporting modules 130 can collect this information from a number of security products/applications on the client 110 or from other sources that monitor or collect user-behavior data. In another embodiment, the module 302 collects/receives this information directly from those security products/applications on the clients 110 without requiring a reporting module 130 on the clients 110.

The attribute-receiving module 304 receives one or more user attributes identified for a user. A number of different attributes can be received. For example, the attributes can include a user's employment status (e.g., employed, unemployed, permanent worker, contract worker, temporary worker, part-time worker, etc.), the user's company department (e.g., the finance department, the marketing department, the engineering department, the product development department or a subdivision for a particular product, etc.), the user's geographic location (e.g., United States, Southern California, Los Angles County, Santa Monica, etc.), the user's demographic characteristics (e.g., age, gender, educational level, ethnicity, etc.), a combination of these, or other attributes or characteristics.

The user-attribute information can be received from a variety of sources. In one embodiment, the information is received from the reporting module 130 on each client 110. The reporting modules 130 can collect this information from corporate directories or corporate intranets providing this data. The information can also be collected as data entered by a system administrator either for the module 304 or entered more generally for other purposes. The information can also be collected from one or more applications or databases associated with a client. In addition, the information can be collected across multiple clients 110 used by the user. In another embodiment, the module 304 collects/receives this information directly from these sources associated with the clients 110 without requiring a reporting module 130 on the clients 110.

The profile-generating module 306 generates a user risk profile for the user based on the received information about the user behaviors and the received user attributes. The user risk profiles can thus include information about the attributes of each user along with information about the behaviors conducted by the user. The user risk profile can further include information about user behaviors conducted by the user across multiple clients 110. Thus, these risk profiles can be behaviorally-derived profiles for each user indicating the user's behaviors across various clients 110 and including attributes or identifying information for the user.

The user scoring module 308 assigns the user a user risk score based on an evaluation of the user risk profile for the user. The user risk score indicates the risk associated with that user, or can indicate the user's trustiworthiness or reputation for performing risky activities. The risk score can higher (or lower, depending on the scoring system used) for users that engage in user behaviors known/suspected to be associated with security problems more frequently than other users. Thus, users with the poorest risk scores are considered to be higher risk or are more likely to perform risky actions than users with less poor or better risk scores. In some embodiments, the user scoring module 308 can define a risk threshold where users having risk scores above the risk threshold value are considered risky. For example, in a scoring system of 1 to 10, where users having a score of 10 are the highest risk users, and the risk threshold value is 6, all users having a user risk score at or above 7 are considered risky users. As another example of a mechanism for scoring, where the scoring system is from 1 to 100 and where 1 represents the highest risk users, the module 308 could define all users with scores from 1 to 25 as very high risk, users from 26 to 50 as high risk, users from 51-75 as medium or low risk, and users from 76-100 as low or very low risk. In other embodiments, the module 308 can apply a ranking system for ranking various users based on their user risk scores, where users having the lowest ranking (or highest ranking, depending on the system) are the highest risk users. Numerous other scoring systems are possible, and these are just a few examples of how the scoring could be performed.

The grouping module 310, included in some embodiments, identifies various user groups based on the user attributes identified for the each of the users (e.g., in the user risk profiles). For example, all users having user attributes indicating that they are in the marketing department of a particular company can be grouped into a marketing department user group. Similarly, all users in the San Francisco division of a company can be grouped into a San Francisco regional group. In addition, users can be grouped according to any of the other user attributes identified above (e.g., all users between ages 15 and 20, all female users in Silicon Valley between ages 20 and 30, all new users, etc.). In some embodiments, the module 310 identifies the user groups by correlating user scores for various users with user attributes for each of those users. For example, if many of the high risk users having the poorest risk scores tend to be in the finance department for a company, the module 310 can determine that this is a user group that ought to be scored and analyzed for group risk patterns. In other embodiments, the system administrator can define the different user groups to be considered. In still other embodiments, the groups can be defined by the divisions or geographical locations within a company (e.g., one group per company division, one group per office in each geographical location, etc.). Further, the user groups do not have to be limited to users in a company, but can include any user groups defined amongst different users (e.g., all users in the United States, or all male users in Los Angeles below age 20).

The group scoring module 312, included in some embodiments, calculates a group risk score for each user group. The user groups with poor user risk scores (e.g., highest or lowest risk scores, depending on the scoring system) are determined to be high risk user groups. In some embodiments, the group risk scores are calculated in the same manners as described above for the user risk scores (e.g., using a risk threshold for the user groups, defining ranges for high/medium/low risk user groups, ranking, or any other scoring system for defining the different risk levels). In other embodiments, the module 312 can calculate the group risk scores based on the user risk scores for each of the users falling within the user groups. The module 312 can add up the user risk scores for all users in a group, can take the average or median score for all users in a group, or can otherwise apply the individual user scores to calculate an overall score for the group. Thus, certain user groups can be determined to be more risky than other user groups. For example, the marketing department in a company might have a poorer group score than the engineering department, indicating that the marking department users tend to engage in risky conduct or engage in such conduct more often than the engineering department users.

In some embodiments, the profile-generating module 306 described above can also generate one or more group risk profiles as described above for the user risk profiles, and these profiles can be evaluated for scoring the groups. Like the user risk profiles, these can include attributes and behaviors, but in this case they are group attributes (e.g., the members of the group are all in a particular department, tend to be over a particular age, etc.) or group behaviors (e.g., the members of the group tend to open suspicious email attachments). Though in other embodiments, no separate group risk profiles are defined, and the group scoring module 312 can score the groups based on data in the user risk profiles of the individual users who are included in each group.

The combined scoring module 314, included in some embodiments, calculates a combined risk score for a given user based on the user risk score assigned to the user and the group risk scores assigned to each of the user groups to which the user belongs. In these embodiments, the grouping module 310 can determine to which user groups a given user belongs based on the user attributes for that user (e.g., as provided in the user risk profile). A given user may belong to the marketing department group, the male user group, the users over 40 years of age group, etc.). As explained above, the group scoring module 312 can provide a group risk score for each of these groups. Thus, the combined risk score determined by the combined scoring module 314 can be an overall or total score for the user based on his individual user score and his group scores. These user and group scores can be added up, averaged, or otherwise combined to determine the combined score for a given user. Other mechanisms for combining or calculating an overall score can also be used.

The remediation module 316 automatically establishes a security policy or initiates security policy changes requiring various remediative actions for the user (or user group) based on the user risk score and/or the combined risk score for the user (or group risk score). The remediation module 316 can, for example, apply the user risk score or combined score (or group risk score) to identify users (or user groups) that engage in behaviors known to be associated with security problems or known to cause malware infections more frequently than other users (or user groups). More remediative actions, or more substantial or restrictive remediative actions, can be taken according to the risk scores, with higher risk users/user groups having more remediative actions and/or more restrictive remediative actions.

There can be various different remediative actions taken. For example, the remediative actions take on one or more of the clients 110 can include increasing the frequency of security scans run, limiting access of the user to certain applications or network resources, restricting privileges of the user, restricting the ability of users to download/install software, requiring regular security update downloads/installations, limiting the websites that can be visited, providing warnings when user attempt to open risky emails/attachments or click on suspicious links, and so forth. The remediative actions can be applied on one or on multiple clients (e.g., only on the user's smartphone, or on both his smartphone and laptop), and the remediative actions applied to different clients 110 can differ in some cases (e.g., more restrictions of user privileges on the user's laptop than on his smartphone).

The remediative actions taken by the remediation module 316 can be automatically taken for the user without requiring interaction with or intervention by the system administrator. Thus, these actions can be instituted automatically by the module 316 itself, without asking for assistance or input from the system administrator. For example, in response to determining that remediative actions should be applied to certain users/user groups, the module 316 can automatically limit their access to resources, require more security scans, etc. Thus, the system administrator does not need to be bothered in determining which changes should be employed each time changes are employed.

The remediation module 316 can also establish a security policy or initiate security policy changes based on security rules configurable by a system administrator. For example, the administrator can define rules that state what types of remediative actions should be taken for which users/groups. For example, the administrator might define a rule that says all users/groups over a certain risk score should be limited in network resource access, or all users/groups falling within a particular range should be forced to run security scans regularly or more frequently. In addition, the administrator can define specific rules for different users/user groups. For example, the administrator can specify that the highest risk users in the marketing department group be limited in network and other privileges, while the highest risk users in the engineering group might not have their privileged limited, but may have to run security scans more frequently. The module 316 can further include a default set of rules that are applied, but allow these to be customizable by the system administrator. In some embodiments, the system administrator sets the security rules only once, and then the remediation module can automatically initiate policy changes from that point on without requiring further input from the administrator.

The security policy changes applied can be updated over time. The security module 120 can regularly update user and group risk profiles and scores over a period of time to reflect changes in risk status of users/groups. Some users/groups may drop into lower risk categories, while others move into higher risk categories. The remediative actions can be changed to compensate for this. Similarly, the system administrator can revise the security or define new rules to address new and evolving threats. In addition, new or different user groups can be defined/revised over time, as needed.

In some embodiments, the remediation module 316 also presents to the system administrator a list of users (or user groups) that are determined to be high risk users (or user groups) to allow proactive, preventative steps to be taken by the system administrator to reduce the risk of these users (or user groups). The module 316 can thus present the highest risk users and groups to the system administrator, allowing them to take additional manual, proactive steps to stop the harm to the clients 110 before it occurs. For example, the preventative measures taken can include requiring high risk users/groups to attend security training, applying risk remediation to members of a particular department, geographic location, providing warnings to certain users, applying other negative actions against users (e.g., reducing compensation or bonuses, giving negative reviews, firing users, etc.), and so forth.

By identifying the users/groups posing the highest security risks, the module 316 provides insight for administrators to focus scarce IT resources and take proactive measures. System administrators are often overwhelmed, overworked, and commonly end up focusing on the wrong items from day-to-day. The ability to evaluate and act on risks based on behavior-profiling of users/groups provides unique benefits to administrators. This further saves administrators' time and increases overall security by allowing these preventative actions. In addition, the more robust security protection provides substantial value to the users, as well.

Figure 3B:
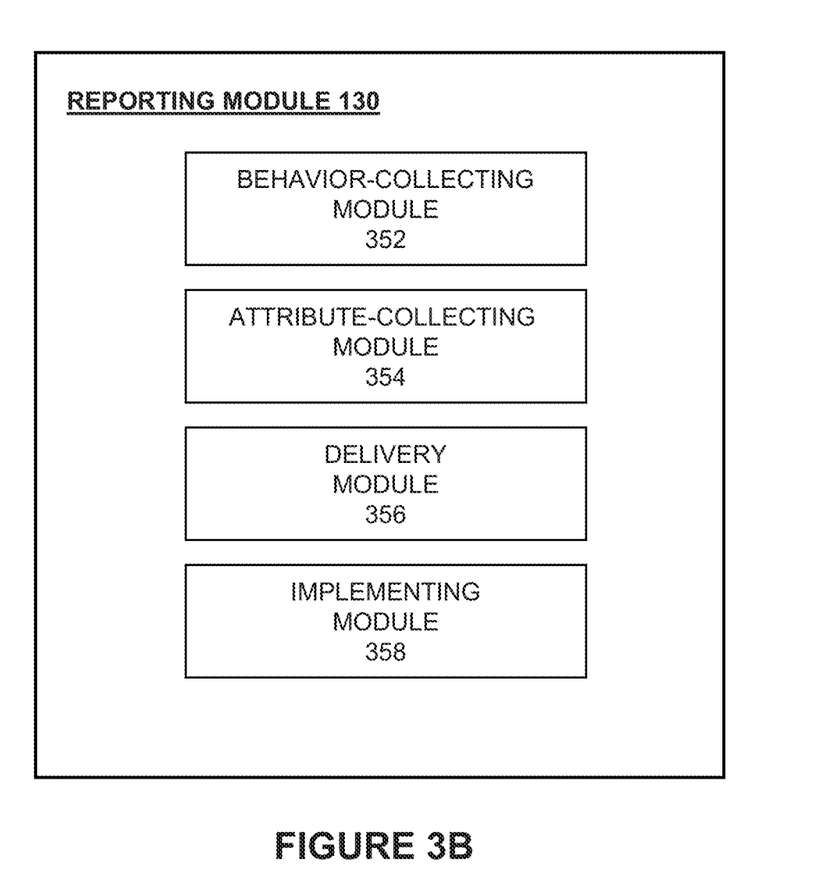
FIG. 3B is a high-level block diagram illustrating the functional modules within the reporting module 130 of the clients 110, according to one embodiment of the present invention.

FIG. 3B is a high-level block diagram illustrating the functional modules within the reporting module 130 of the client 110, according to one embodiment of the present invention. The client 110, in the embodiment illustrated in FIG. 3B, includes a behavior-collecting module 352, an attribute-collecting module 354, a delivery module 356, and an implementing module 358.

The behavior-collecting module 352 collects information about user behavior for a user of a client 110. Where the user is using multiple clients 110, each of the clients 110 can have a behavior-collecting module 352 that collects behavior data for its user 110. In some cases, more than one user might use a single client 110 (e.g., different users logging onto a shared computer in a company). If more than one user logs onto a single client 110, the module 352 can collect behavior data separately for each user. As explained above, this data can be collected from a variety of different sources on the client(s) 110, including security applications on the clients 110, security databases, registries, or any other source recording information about user behavior.

The attribute-collecting module 354 collects one or more user attributes identified for a user. Where the user is using multiple clients 110, each of the clients 110 can have an attribute-collecting module 354 that collects attribute data for its user 110. If more than one user logs onto a single client 110

(e.g., different users logging onto a shared computer in a company), the module 352 can collect attribute data separately for each user. As explained above, these attributes can be collected from corporate directories or other corporate resources, from applications or databases associated with a client 110, from data entered by a system administrator, and so forth. Thus, the data collection can be manual or automated. In some embodiments, the module 354 can be integrated with a corporate directory for collecting data.

The delivery module 356 provides the collected information about user behaviors and the collected one or more user attributes to the security server 116 for analysis. Each client 110 used by the user can have a module 356 that delivers the behavior and attribute data collected for its user. If multiple users log onto a client 110, the module 356 can deliver to the server 116 information collected separately for each user. The collected data can be received by modules 302 and 304 on the server 116.

The implementing module 358 implements one or more remediative actions required by security policy changes automatically initiated by the security server 116. If the server 116 indicates that the privileges for a given user logged into a client 110 should be restricted, the module 358 can require these changes or implement these policies. Similarly, any of the other examples given above for remediation on a client 110 can be implemented by module 358.

Figure 4:
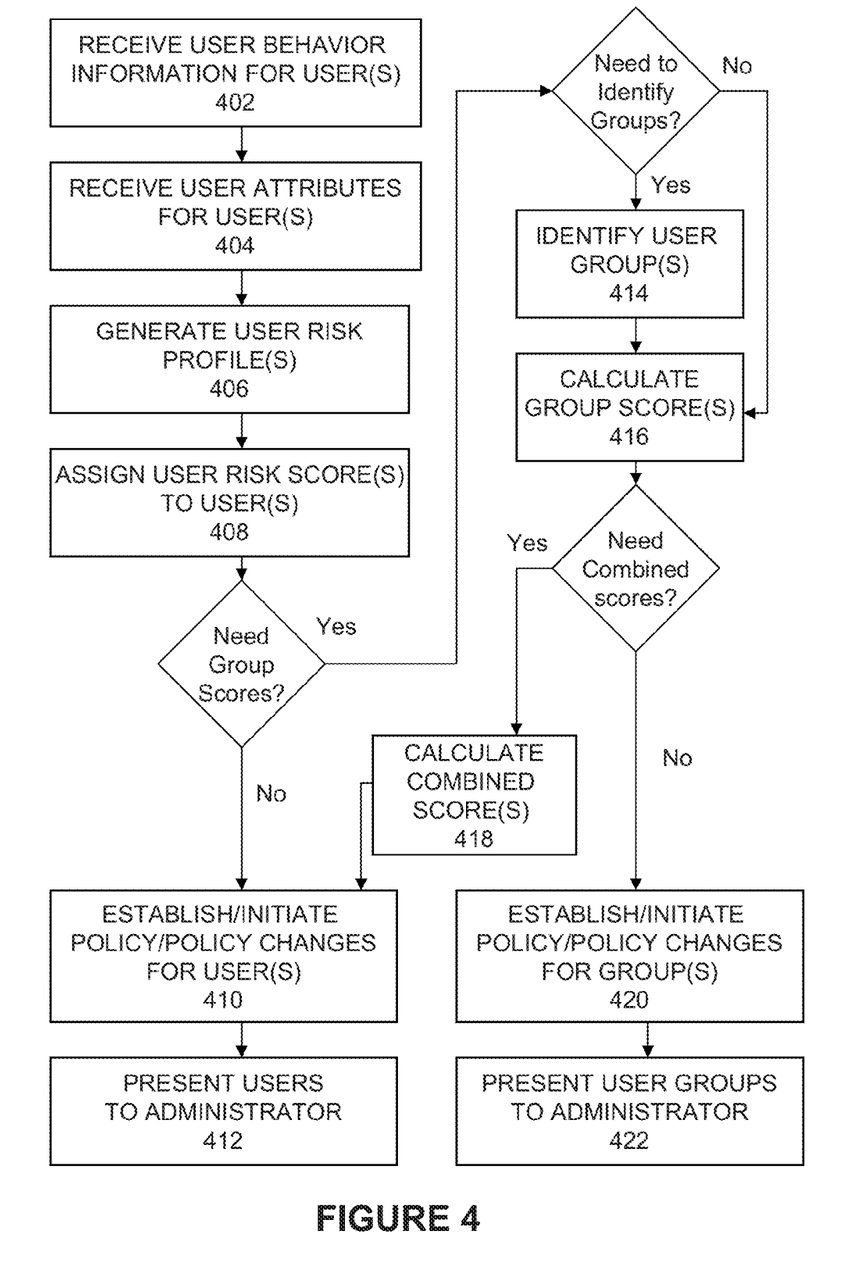
FIG. 4 is a flowchart illustrating steps performed by the security module 120, according to one embodiment of the present invention.

Referring now to FIG. 4, there is shown a flowchart illustrating the operation of the security module 120, according to some embodiments of the present invention. It should be understood that these steps are illustrative only. Different embodiments of the security module 120 may perform the illustrated steps in different orders, omit certain steps, and/or perform additional steps not shown in FIG. 4.

As shown in FIG. 4, the security module 120 receives 402 information about user behaviors for the user across multiple clients (e.g., a laptop, a smartphone, etc.) with which the user interacts. In some embodiments, the security module 120 receives this information from a module (e.g., reporting module 130) on the client 110 that collects this data from various security products and other applications that have access to or record user behavior data. The security module 120 can also receive this data directly from those security products, applications, etc. The security module 120 also receives 404 one or more user attributes identified for a user (e.g., from a corporate directory or other information source having data about each user). The module 120 can receive 402, 404 this types of information for a single user or for multiple different users. The module 120 further generates 406 a user risk profile for the user based on the received information about the user behaviors and the received user attributes. Where there are multiple users, a user risk profile can be generated 406 for each. The module 120 can further assign 408 the user (or each of multiple users) a user risk score based on an evaluation of the user risk profile for the user. The user risk score can indicate the likelihood of that user to engage in risky behaviors or behaviors known to be associated with security problems or malware infections (e.g., visiting suspicious websites, downloading untrustworthy software, etc.).

The security module 120 can also determine whether the method is to be performed for a single user (or each of multiple single users) or for a user group (or possibly for both). Where group scoring is not to be performed, the security module 120 can continue with the single user(s) method. In this case, the module 120 can automatically establish 410 a security policy or initiate 410 security policy changes requiring remediative actions for the user based on the user risk score. The remediative actions can also or alternatively be based on security rules configurable by a system administrator. The security rules can be configured by the system administrator to adjust the remediative actions taken against different users (e.g., selecting limited resource access for the very highest risk users, but allowing full access with more frequent security scans for less risky users). Certain remediative actions can be automatically taken for the user without requiring interaction with the system administrator (e.g., automatic limitation of access by the user to certain resources, automatic download/installation of security patches on the user's client, etc.). In some embodiments, the module 120 also presents 412 to the system administrator a list of users (or information about certain users) that are determined to be high risk users to allow preventative steps to be taken by the system administrator to reduce the risk of these users (e.g., providing user security training, etc.). In other embodiments, the module 120 may not take automatic actions (or may take only limited actions) based on a security policy (e.g., step 410 could be optional). In these cases, the module 120 can just report the information (e.g., present 412 information regarding the risky users) to the system administrator who can then take actions regarding these users.

Where group scoring is needed, the security module 120 can determine whether the user groups need to be identified or recognized. If so, the module 120 can identify 414 one or more user groups before calculating 416 the group scores. For example, the module 120 can identify the various company departments in an organization as different user groups to be analyzed, or can identify all users of a certain age, gender, and so forth. In some embodiments, identifying 414 the user group includes identifying 414 or determining what users make up the user group. In some embodiments, the module 120 identifies various user groups by correlating user risk scores for multiple users with user attributes for each of those users (e.g., all users in the finance department tend to have poor risk scores, while all users in the various technical departments tend to score well with regard to risk). If the module 120 already knows what groups are to be analyzed, the module 120 can then calculate 416 the group risk score for the user group or for each of the multiple user groups. In some embodiments, the module 120 calculates 416 each group risk score based on the user risk scores calculated/assigned 408 for the users in the group, or by using the methods used to calculate/assign 408 those scores.

The security module 120 can also determine whether the method is to include calculating 418 combined scores for each user. Where combined scores are not to be calculated 418 (or not yet), the module 120 can proceed to automatically establishing 420 a security policy or initiating 420 security policy changes requiring remediative actions for each of the user groups based on the group risk score. These can also or alternatively be based on the security rules configurable by the system administrator. In some embodiments, the module 120 also presents 422 to the system administrator information about one or more user groups determined to be high risk to allow preventative steps to be taken by the system administrator. In other embodiments, the module 120 may not take or may take limited automatic actions based on a security policy (e.g., step 420 could be optional). In these cases, the module 120 can report the information (e.g., present 412 information regarding the risky users) to the system administrator who can then take actions regarding these user groups.

Where combined scores are to be calculated 418 for one or more users, the module 120 can proceed to the combined score calculation 418 step. As explained above, the identifying 414 of user groups step can include determining to which of various user groups each user belongs based on the user attributes. Thus, user A may belong to any or all of the Bay Area user group, the Silicon Valley user group, and the marketing department user group. In addition, each user group has a group risk score that was calculated 416. This group score can then be combined with the user risk score that was calculated 408 to generate/calculate 418 a combined or overall risk score for the user. The module 120 can automatically establish 410 a security policy or initiate 410 security policy changes requiring remediative actions for the user based on the combined risk score. These can also be based on the security rules configurable by the system administrator. As explained above, in some embodiments the module 120 also presents 412 to the system administrator a list of users or information about those users that are determined to be high risk to allow proactive measures against this risk. In other embodiments, the module 120 may not take or may take limited automatic actions based on a security policy (e.g., step 410 could be optional). In these cases, the module 120 can present 412 the information to the system administrator who can then take actions regarding these users.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of establishing a security policy for a user based on risk information for that user, the method comprising:
receiving information about user behaviors for the user across a plurality of clients with which the user interacts;
receiving one or more user attributes identified for the user;
generating a user risk profile for the user based on the received information about the user behaviors and the received user attributes;
assigning the user a user risk score based on an evaluation of the user risk profile for the user;
identifying a plurality of user groups to which the user belongs based on the user attributes;
assigning the user a group risk score for each of the identified user groups to which the user belongs, each group risk score calculated based on the risk scores of the users in the user group, and each group risk score indicating a likelihood of engaging in risky behaviors by the users of the user group;
calculating a combined user risk score for the user based on the user risk score and at least one of the group risk scores; and
automatically establishing a security policy requiring a plurality of remediative actions for the user based on the combined user risk score.

2. The method of claim 1, wherein the user behaviors comprise behaviors of the user that indicate whether the user has a tendency to engage in risky behaviors that are known to be more likely to lead to infections of clients by malware than other behaviors.

3. The method of claim 1, wherein the user attributes comprise identifying attributes of the user that are selected from the group consisting of: employment status, company department, geographic location, demographic characteristics, and any combination of these.

4. The method of claim 1, wherein the remediative actions are taken for the user responsive to the user risk score indicating that the user takes risky actions associated with malware infections more frequently than other users.

5. The method of claim 1, further comprising:
automatically establishing a security policy or initiating security policy changes requiring a plurality of remediative actions for each of the user groups based on the group risk score.

6. The method of claim 1, further comprising presenting to the system administrator a list of users or a list of groups of users that are determined to be high risk users to allow preventative steps to be taken by the system administrator to reduce the risk of these users or these groups.

7. A non-transitory computer-readable storage medium storing executable computer program instructions for establishing a security policy for a user based on risk information for that user, the computer program instructions comprising instructions for performing the steps comprising:
receiving information about user behaviors for the user across a plurality of clients with which the user interacts;
receiving one or more user attributes identified for the user;
generating a user risk profile for the user based on the received information about the user behaviors and the received user attributes;
assigning the user a user risk score based on an evaluation of the user risk profile for the user;
identifying a plurality of user groups to which the user belongs based on the user attributes;
assigning the user a group risk score for each of the identified user groups to which the user belongs, each group risk score calculated based on the risk scores of the users in the user group, and each group risk score indicating a likelihood of engaging in risky behaviors by the users of the user group;
calculating a combined user risk score for the user based on the user risk score and at least one of the group risk scores; and
automatically establishing a security policy requiring a plurality of remediative actions for the user based on the combined user risk score.

8. The computer-readable storage medium of claim 7, wherein the user behaviors for which information is collected are selected from a group consisting of:
clicking on links in email messages sent by other users that are not in an address book of the user, using weak passwords, using peer-to-peer sites, clicking on email messages that are detected as spam, and ignoring security warnings by security applications.

9. The computer-readable storage medium of claim 7, wherein automatically establishing a security policy further comprises automatically initiating security policy changes requiring a plurality of remediative actions for the user based on the combined user risk score and on a plurality of security rules configurable by a system administrator.

10. The computer-readable storage medium of claim 9, wherein the security rules are configurable by the system administrator to adjust the remediative actions taken against different users and user groups.

11. The computer-readable storage medium of claim 7, further comprising:
   correlating user scores for a plurality of users with user attributes for each of those users to identify a plurality of user groups; and
   calculating a group risk score for each of the user groups.

12. The computer-readable storage medium of claim 7, further comprising:
   automatically establishing a security policy or initiating security policy changes requiring a plurality of remediative actions for each of the user groups based on the group risk score.

13. The computer-readable storage medium of claim 7, wherein one or more of the remediative actions are automatically taken for the user without requiring interaction with the system administrator.

14. A computer system for establishing a security policy for a user based on risk information for that user, the system comprising:
   a non-transitory computer-readable storage medium storing executable software modules, comprising:
      a behavior-receiving module for receiving information about user behaviors for the user across a plurality of clients with which the user interacts;
      an attribute-receiving module for receiving one or more user attributes identified for the user;
      a profile-generating module for generating a user risk profile for the user based on the received information about the user behaviors and the received user attributes; a user scoring module for assigning the user a user risk score based on an evaluation of the user risk profile for the user;
      a grouping module for identifying a plurality of user groups to which the user belongs based on the user attributes;
      a group scoring module for assigning the user a group risk score for each of the identified user groups to which the user belongs, each group risk score calculated based on the risk scores of the users in the user group, and each group risk score indicating a likelihood of engaging in risky behaviors by the users of the user group;
      a combined scoring module for calculating a combined user risk score for the user based on the user risk score and at least one of the group risk scores;
      a remediation module for automatically establishing a security policy requiring a plurality of remediative actions for the user based on the user risk score; and
   a processor configured to execute the software modules stored by the computer-readable storage medium.

15. The system of claim 14, wherein the behavior-receiving module and the attribute-receiving module are further configured to receive the information and user attributes from a client module on each of the clients of the user that collects this data from security programs and corporate directory information on each of the clients.

16. The system of claim 14, wherein the behavior-receiving module and the attribute-receiving module are configured to receive the information about user behaviors and the one or more user attributes for each of a plurality of users, and wherein the system further comprises:
   the remediation module for automatically initiating security policy changes and a plurality of remediative actions for each of the user groups based on the group risk score.

17. The system of claim 14, further comprising:
   the combined scoring module for calculating the combined risk score for the user based on the user risk score assigned to the user and the group risk scores assigned to each of the user groups to which the user belongs.

18. The system of claim 14, wherein the remediation module is further configured to apply the user risk score to identify users that more frequently engage in user behaviors known to be associated with security problems than other users.

19. The system of claim 14, wherein the remediative actions are selected from a group consisting of: increasing a frequency of security scans run on one or more of the clients, limiting access of the user to certain applications or network resources one or more of the clients,
   and restricting privileged of the user on one or more of the clients.

* * * * *